US012757990B2

(12) United States Patent
Shi

(10) Patent No.: US 12,757,990 B2
(45) Date of Patent: Oct. 13, 2026

(54) PACKAGING BOX WITH FILM STICKING FUNCTION

(71) Applicant: Shenzhen B2 Technology Co.,Ltd., Shenzhen (CN)

(72) Inventor: Hongbing Shi, Shenzhen (CN)

(*) Notice: Subject to any disclaimer, the term of this patent is extended or adjusted under 35 U.S.C. 154(b) by 289 days.

(21) Appl. No.: 18/430,773

(22) Filed: Feb. 2, 2024

(65) Prior Publication Data

US 2024/0164498 A1 May 23, 2024

(30) Foreign Application Priority Data

Oct. 27, 2023 (CN) ......................... 202322923367.8

(51) Int. Cl.
*B29C 63/00* (2006.01)
*A45C 11/00* (2006.01)

(52) U.S. Cl.
CPC .......... *A45C 11/00* (2013.01); *B29C 63/0004* (2013.01); *A45C 11/002* (2025.01); *B29C 2063/0008* (2013.01)

(58) Field of Classification Search
CPC ... A45C 11/00; A45C 11/002; B29C 63/0004; B29C 2063/0008
See application file for complete search history.

(56) References Cited

U.S. PATENT DOCUMENTS

2023/0182373 A1* 6/2023 Tang ....................... B29C 63/02 156/538
2023/0191767 A1* 6/2023 Zhang ..................... B29C 63/02 156/391
2023/0211591 A1* 7/2023 Zhou ................... B32B 37/0053 156/381
2024/0123677 A1* 4/2024 Melville ................. B29C 63/02

* cited by examiner

*Primary Examiner* — Ping Y Hsieh
(74) *Attorney, Agent, or Firm* — Daniel M. Cohn; Howard M. Cohn

(57) ABSTRACT

The present invention belongs to the technical field of packaging boxes, and in particular relates to a packaging box with a film sticking function, including a bottom box and an upper cover, where a side wall of the upper cover is provided with a pull-out opening, an inner wall of the upper cover is connected with a protective film set, a pull-out bar of the protective film set passes through the pull-out opening and extends out of the pull-out opening, and the protective film set and the upper cover jointly cover the bottom box to form a positioning cavity. The packaging box provided by the present invention integrates functions of film sticking and glass protective film packaging, facilitating use by users.

1 Claim, 11 Drawing Sheets

PACKAGING BOX WITH FILM STICKING FUNCTION

TECHNICAL FIELD

The present invention belongs to the technical field of packaging boxes, and in particular relates to a packaging box with a film sticking function.

BACKGROUND

A traditional packaging box (such as a glass protective film packaging box) only has a function of packaging. When film sticking for a mobile phone is required, one method is to stick the film with bare hands, with a low accuracy and easy crooked sticking, the other method is to purchase a special film sticking tool separately, which not only increases the cost, but also has an extremely low frequency of use, resulting in waste. At the same time, the existing film sticking tool is usually made of plastic and provided with a positioning part such that consumers are convenient to align the protective film by themselves. As for the self-aligned protective film, not all consumers can stick it well. It is difficult for the consumers to stick the film perfectly, especially for handicapped people, who cannot align and stick the film well.

Therefore, the inventor is committed to designing a packaging box to solve the above problems.

SUMMARY

An object of the present invention is to provide a packaging box with a film sticking function, which cannot only package a glass protective film, but also facilitate positioning and film sticking, and is suitable for all people to quickly stick the film.

To achieve the above object, a technical solution adopted by the present invention is as follows:

A packaging box with a film sticking function includes a bottom box and an upper cover, where a side wall of the upper cover is provided with a pull-out opening, an inner wall of the upper cover is connected with a protective film set, a pull-out bar of the protective film set passes through the pull-out opening and extends out of the pull-out opening, the protective film set and the upper cover are jointly cover the bottom box to form a positioning cavity for placing a mobile phone and an accessory.

As an improvement of the packaging box with a film sticking function in the present invention, the bottom box and the upper cover are made of n environmentally friendly paper material, the bottom box includes a box body and a positioning assembly, a covering surface of the box body is hollowed out, the positioning assembly is located in the box body, and the positioning assembly is provided with a mobile phone placement slot.

As an improvement of the packaging box with a film sticking function in the present invention, the positioning assembly includes a bottom frame and a positioning plate, an edge of the positioning plate is in support connection with the box body through the bottom frame, a covering surface of the positioning plate is concavely arranged to form the mobile phone placement slot, and a bottom of the mobile phone placement slot is provided with a camera avoidance slot and a receiving slot at an interval.

As an improvement of the packaging box with a film sticking function in the present invention, a limiting slot is provided on a side wall of the box body, the limiting slot is provided in a width direction of the protective film set, and when the upper cover is covered with the bottom box, the protective film set is located in the limiting slot.

As an improvement of the packaging box with a film sticking function in the present invention, the pull-out opening is arranged in a width direction of the upper cover, a fixing plate is fixed to a side wall, away from the pull-out opening, of the bottom box and the bottom box is in folded and rotary connection with the upper cover through the fixing plate.

As an improvement of the packaging box with a film sticking function in the present invention, an outer wall of the fixing plate is vertically connected with a hanging buckle, and two opposite side walls of the upper cover in a length direction thereof are provided with handle slots, respectively.

As an improvement of the packaging box with a film sticking function in the present invention, a pressure-maintaining tampon is fixed to an inner wall of the upper cover in a length direction thereof, and the pressure-maintaining tampon is located between the upper cover and the protective film set.

As an improvement of the packaging box with a film sticking function in the present invention, the protective film set includes a mask, a glass protective film and a release film; the mask, the glass protective film and the release film are sequentially stacked from inside to outside and arranged on the inner wall of the upper cover; and the pull-out bar is arranged at a bottom of the release film and connected with a connecting end of the release film.

As an improvement of the packaging box with a film sticking function in the present invention, both ends of the mask are adhesively connected with the upper cover through fixing adhesives in respective, the pressure-maintaining tampon is located between the two fixing adhesives, and the release film is adhered to the glass protective film through AB glue.

As an improvement of the packaging box with a film sticking function in the present invention, the connecting end of the release film is adhered to the mask through an adhesive fixing bar, and the adhesive fixing bar is located outside the glass protective film.

Compared with the prior art, according to the packaging box with a film sticking function provided by the present invention, the protective film set is arranged on the inner wall of the upper cover, and the upper cover and the protective film set directly cover the bottom box together to form the positioning cavity, thereby achieving a purpose of packaging the glass protective film. The positioning cavity is used to place the mobile phone and various accessories, and then the pull-out bar is pulled outwards from the pull-out opening, such that the release film of the protective film set can be pulled out and dust on the mobile phone can be taken away, making the glass protective film of the protective film set be accurately attached to the screen of the mobile phone. The entire packaging box integrates the functions of mobile phone film sticking and glass protective film packaging, which is convenient for positioning and adhering, and suitable for all people to quickly sticking the film.

Figure 1:
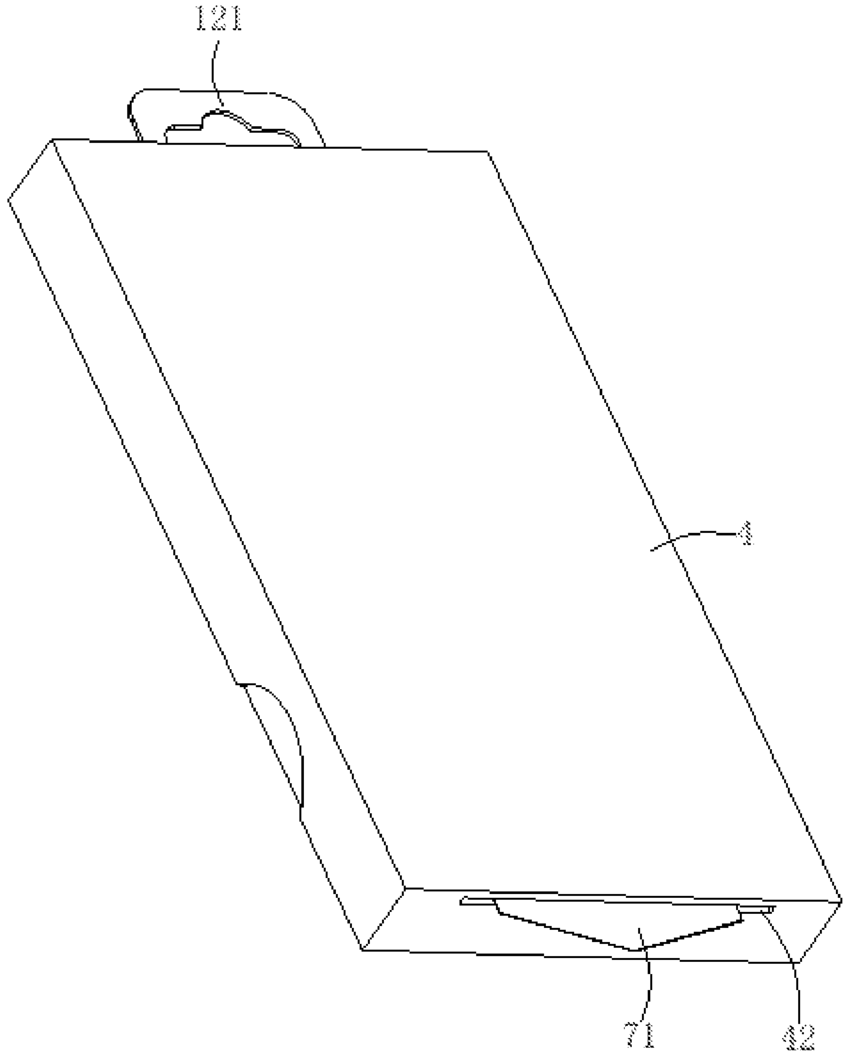
FIG. 1 is a perspective view of a packaging box with a film sticking function according to the present invention.
Figure 2:
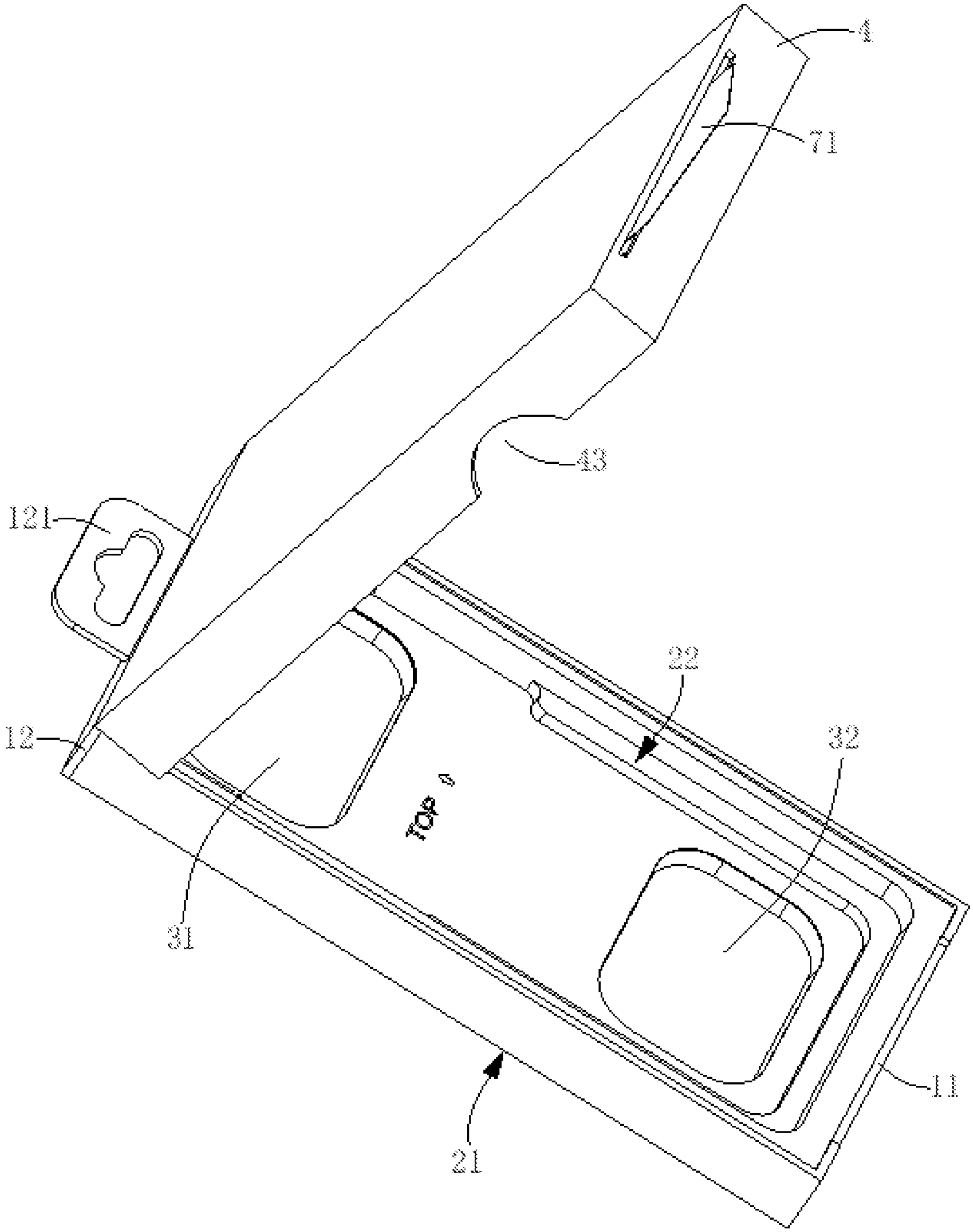
FIG. 2 is a perspective view of a packaging box with a film sticking function in an open state according to the present invention.

1. box body; 11. limiting slot; 12. fixing plate; 121. hanging buckle; 2. bottom frame; 21. bottom box; 22. positioning assembly; 3. positioning plate; 31. camera avoidance slot; 32. receiving slot; 33. mobile phone placement slot; 34. upper protrusion; 35. lower protrusion; 4. upper cover; 41. pressure-maintaining tampon; 42. pull-out opening; 43. handle slot; 5. mask; 51. fixing adhesive; 6. glass protective film; 7. release film; 71. pull-out bar; 72. AB glue; 73. adhesive fixing bar; 8. protective film set; 9. mobile phone.

DETAILED DESCRIPTION

The following describes the implementations of the present invention in detail with reference to the drawings, which are for reference and illustration only and do not constitute a limitation to the scope of patent protection of the present invention.

Referring to FIG. 1 to FIG. 11, a packaging box with a film sticking function includes a bottom box 21, an upper cover 4 and a protective film set 8, where a side wall of the upper cover 4 is provided with a pull-out opening 42, the protective film set 8 is arranged on an inner wall of the upper cover 4, a pull-out bar 71 of the protective film set 8 passes through the pull-out opening 42 and extends out of the pull-out opening 42, the protective film set 8 and the upper cover 4 jointly cover the bottom box 21 to form a positioning cavity for placing a mobile phone 9 and various accessories.

Referring to FIG. 3, FIG. 4, FIG. 5 and FIG. 8, since the products with film sticking functions sold on the market are basically made of plastic, which is difficult to naturally degrade into harmless components, resulting in a poor environmental protection property of the film sticking products. Therefore, the bottom box 21 and the upper cover 4 of the present invention both are made of an environmentally friendly paper material that is naturally degradable; the bottom box 21 includes a box body 1 and a positioning assembly 22; a covering surface of the box body 1 is hollowed out; the box body 1 is made of an environmentally friendly paper material, a limiting slot 11 is provided on a side wall of the box body 1, the limiting slot 11 is provided in width directions of the protective film set 8 and the box body 1; when the upper cover 4 is covered with the box body 1, the protective film set 8 is located in the limiting slot 11, the positioning assembly 22 is located in the box body 1 and provided with a mobile phone placement slot 33, and the positioning assembly 22 includes a bottom frame 2 and a positioning plate 3; the bottom frame 2 is frame-shaped, and both the bottom frame 2 and the positioning plate 3 are made of an environmentally friendly paper material, the bottom frame 2 and the positioning plate 3 both are located in the box body 1, an upper protrusion 34 and a lower protrusion 35 are convexly arranged at an interval from the back of the positioning plate 3 to the inside of the box body 1, the bottom frame 2 is sleeved outside the upper protrusion 34 and the lower protrusion 35, an edge of the positioning plate 3 is in support connection with the box body 1 through the bottom frame 2, the covering surface of the positioning plate 3 is concavely arranged to form the mobile phone placement slot 33, a bottom of the mobile phone placement slot 33 is provided with a camera avoidance slot 31 and a receiving slot 32 at an interval, the camera avoidance slot 31 is used to make space for the camera of the mobile phone 9, the receiving slot 32 is used to place various accessories (such as an alcohol bag, a manual, etc.) or other objects, the camera avoidance slot 31 corresponds to the position of the upper protrusion 34, and the position of the receiving slot 32 corresponds to that of the lower protrusion 35.

Figure 3:
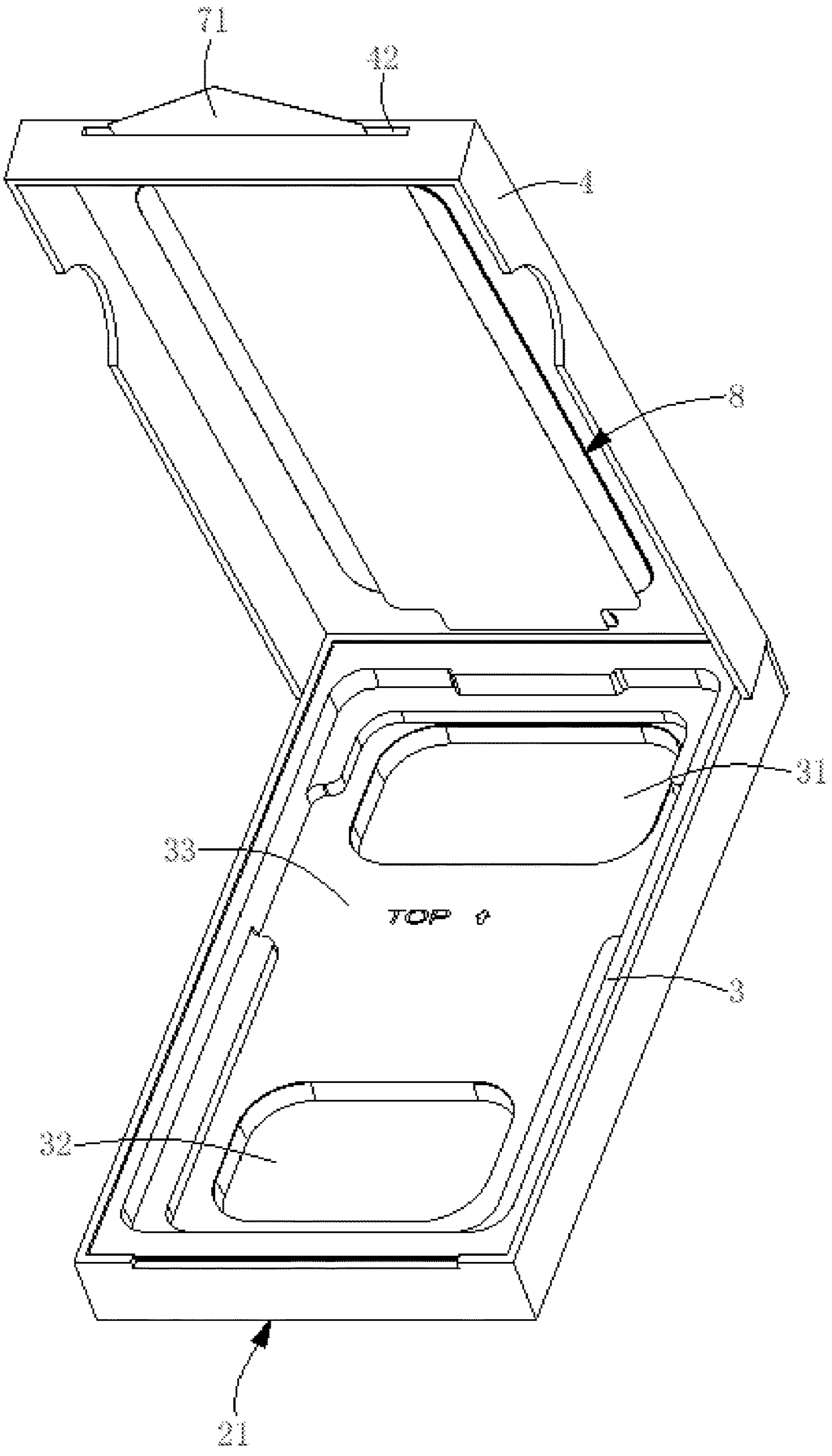
FIG. 3 is another perspective view of a packaging box with a film sticking function in an open state according to the present invention.
Figure 4:
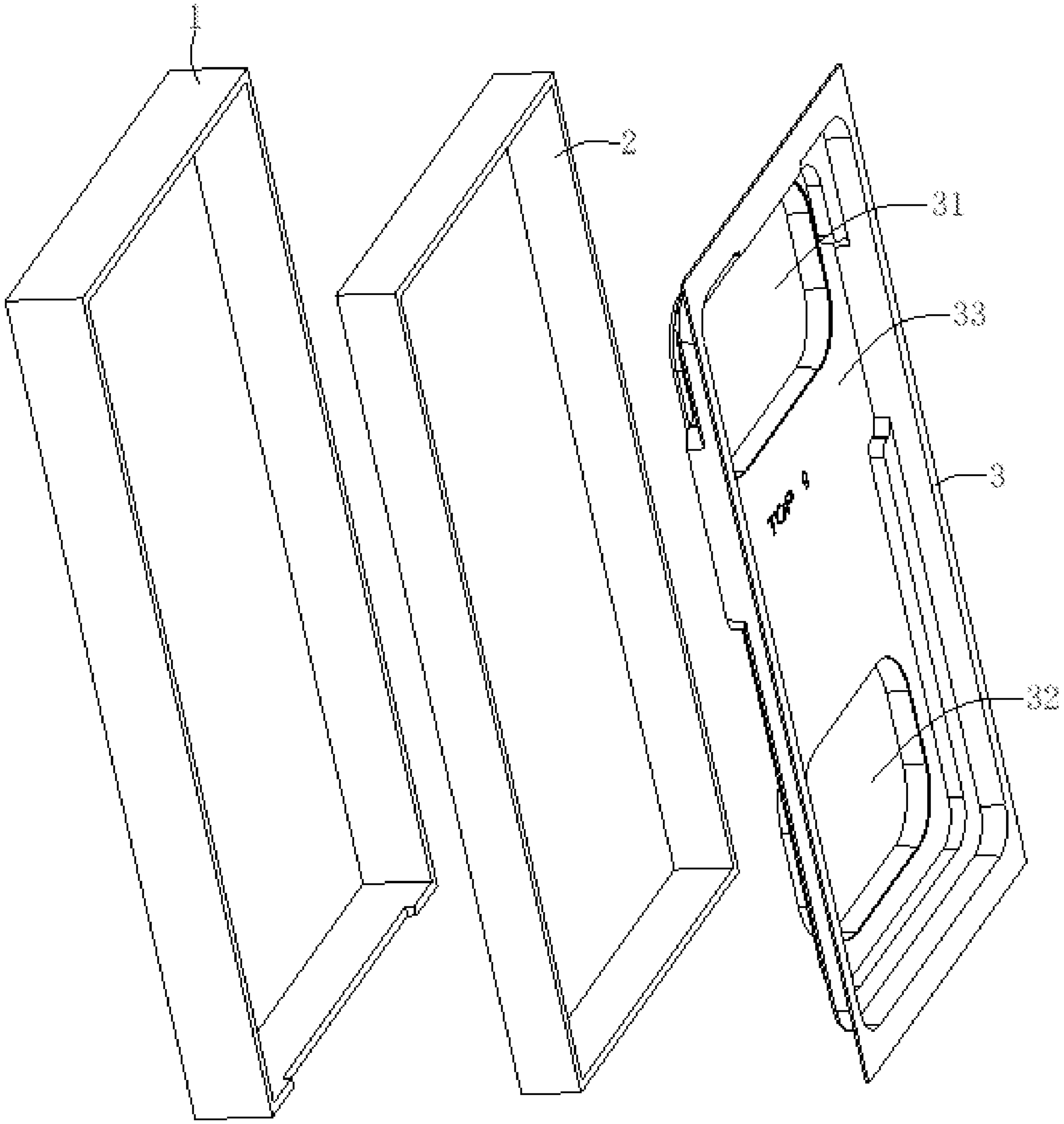
FIG. 4 is an exploded perspective view of a bottom box according to the present invention.
Figure 5:
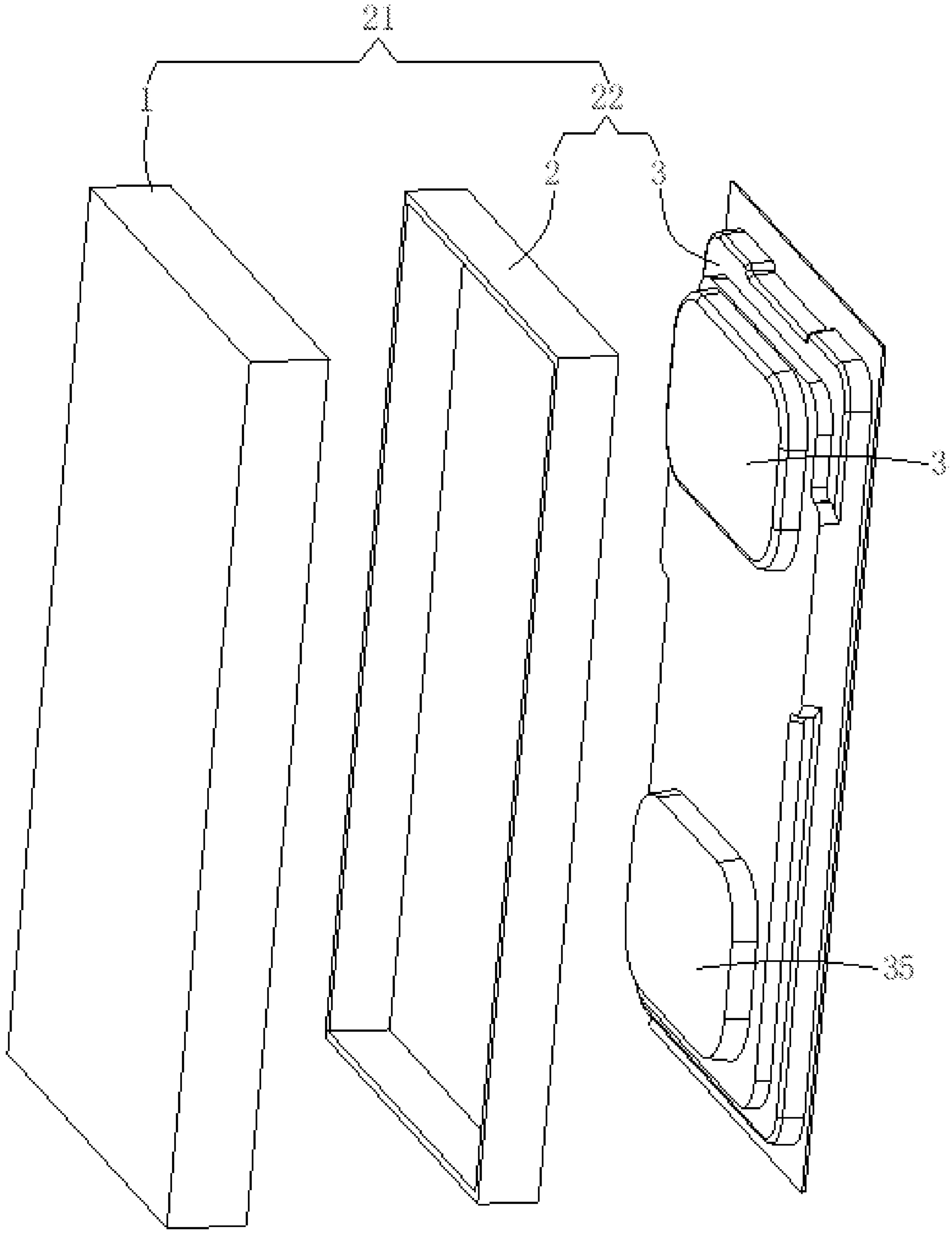
FIG. 5 is an exploded perspective view of a bottom box from another perspective according to the present invention.
Figure 6:
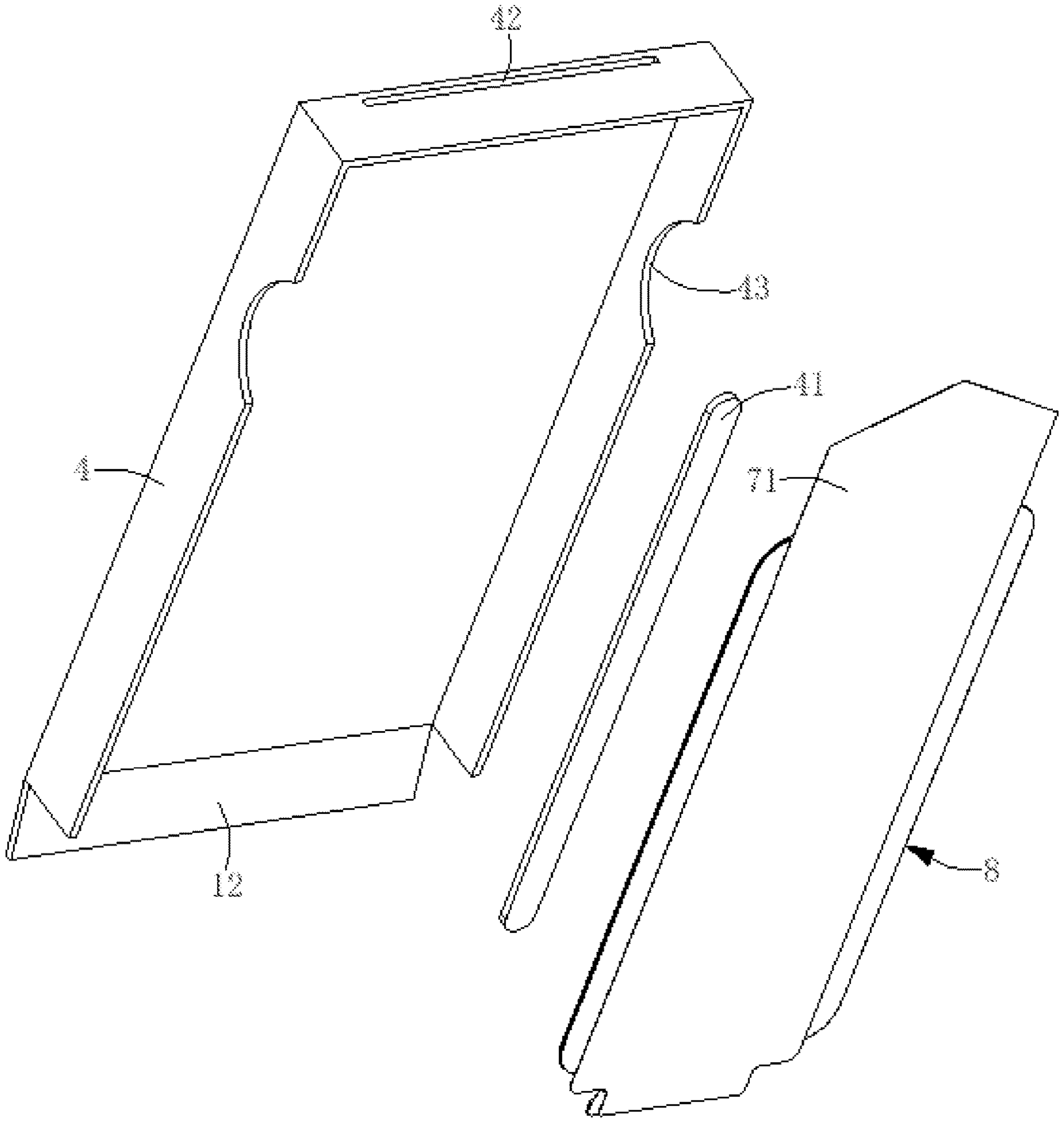
FIG. 6 is an exploded perspective view of an upper cover, a pressure-maintaining tampon and a protective film set according to the present invention.
Figure 7:
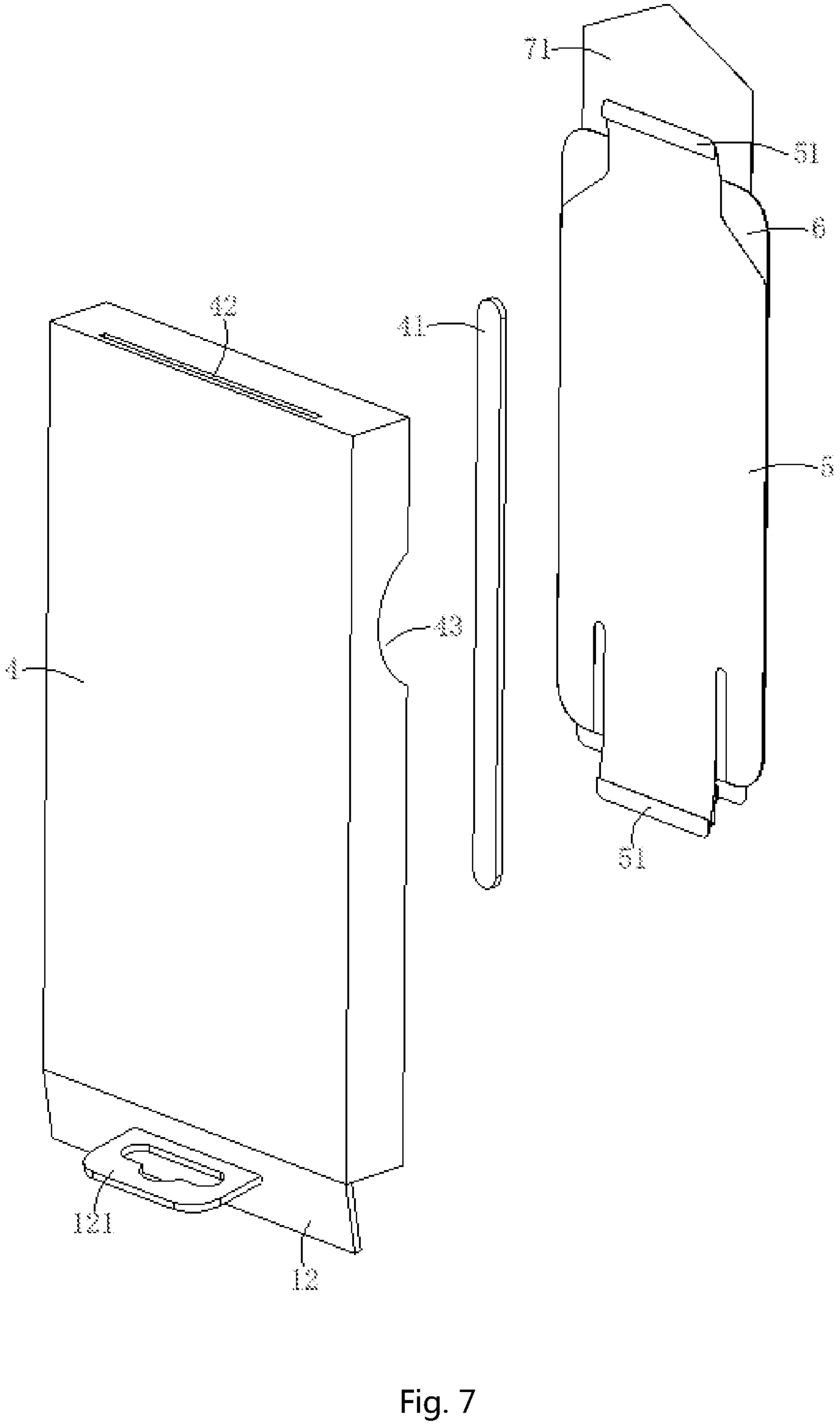
FIG. 7 is an exploded perspective view of an upper cover, a pressure-maintaining tampon and a protective film set from another perspective according to the present invention.

Referring to FIG. 3, FIG. 6 and FIG. 7, a bottom of the upper cover 4 is hollowed out, the pull-out opening 42 is in a strip shape and arranged in a width direction of the upper cover 4, the upper cover 4 and the protective film set 8 jointly cover on the mobile phone placement slot 33 to form the positioning cavity, and two opposite side walls of the upper cover 4 in a length direction thereof are provided with handle slots 43, respectively; and when the upper cover 4 is covered with the box body 1, the user can open the upper cover 4 through the two handle slots 43.

Referring to FIG. 1, FIG. 2, FIG. 7 and FIG. 10, one side, away from the pull-out opening 42, of the upper cover 4 is rotatably connected with the box body 1, specifically, a fixing plate 12 is fixed to a side wall, away from the pull-out opening 42, of the box body 1, the box body 1 is in a folded and rotary connection with the upper cover 4 through the fixing plate 12, the upper cover 4 can rotate around the edge of the fixing plate 12, an outer wall of the fixing plate 12 is vertically connected with a hanging buckle 121, and the user can hang the packaging box with the glass protective film 6 and accessories in stores for sale by using the hanging buckle 121.

Figure 8:
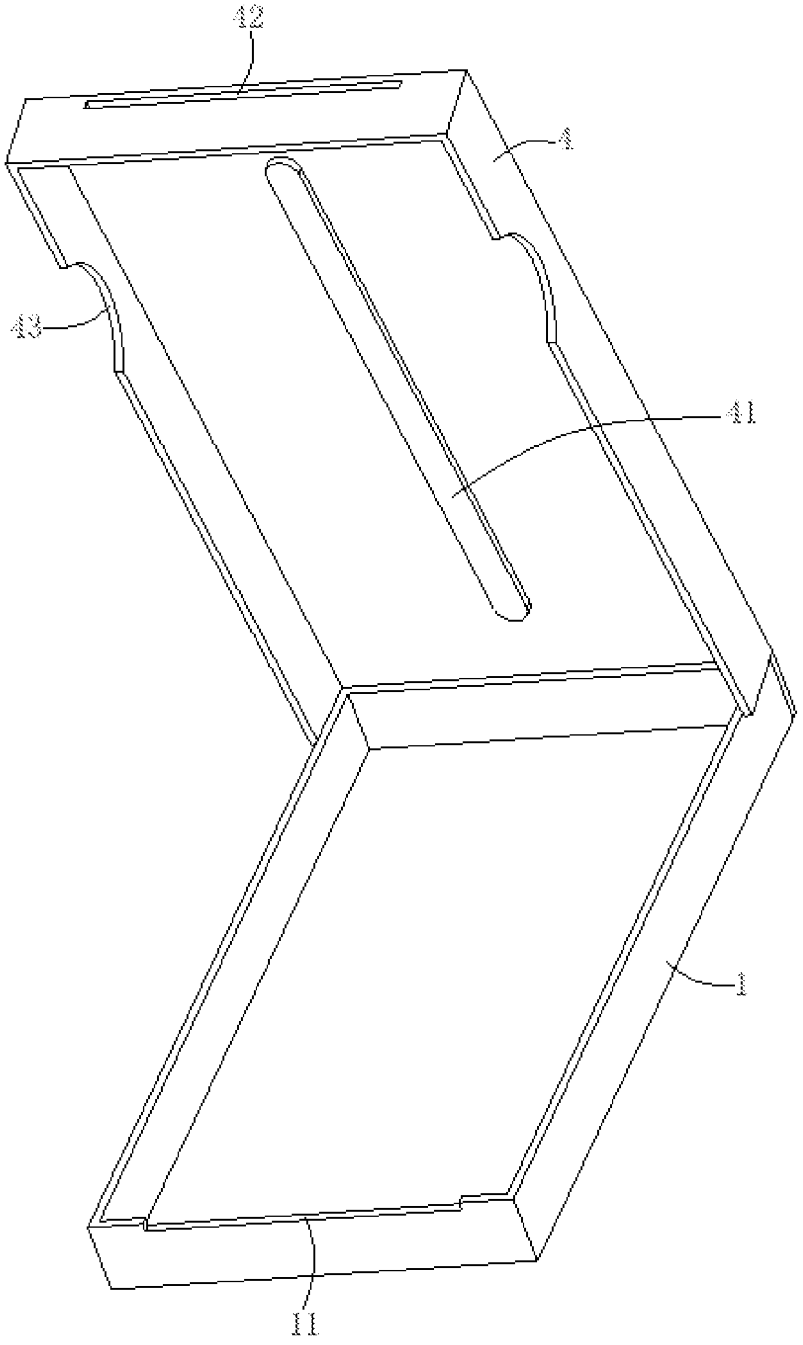
FIG. 8 is a perspective view of an upper cover and a box body in an open state according to the present invention.
Figure 9:
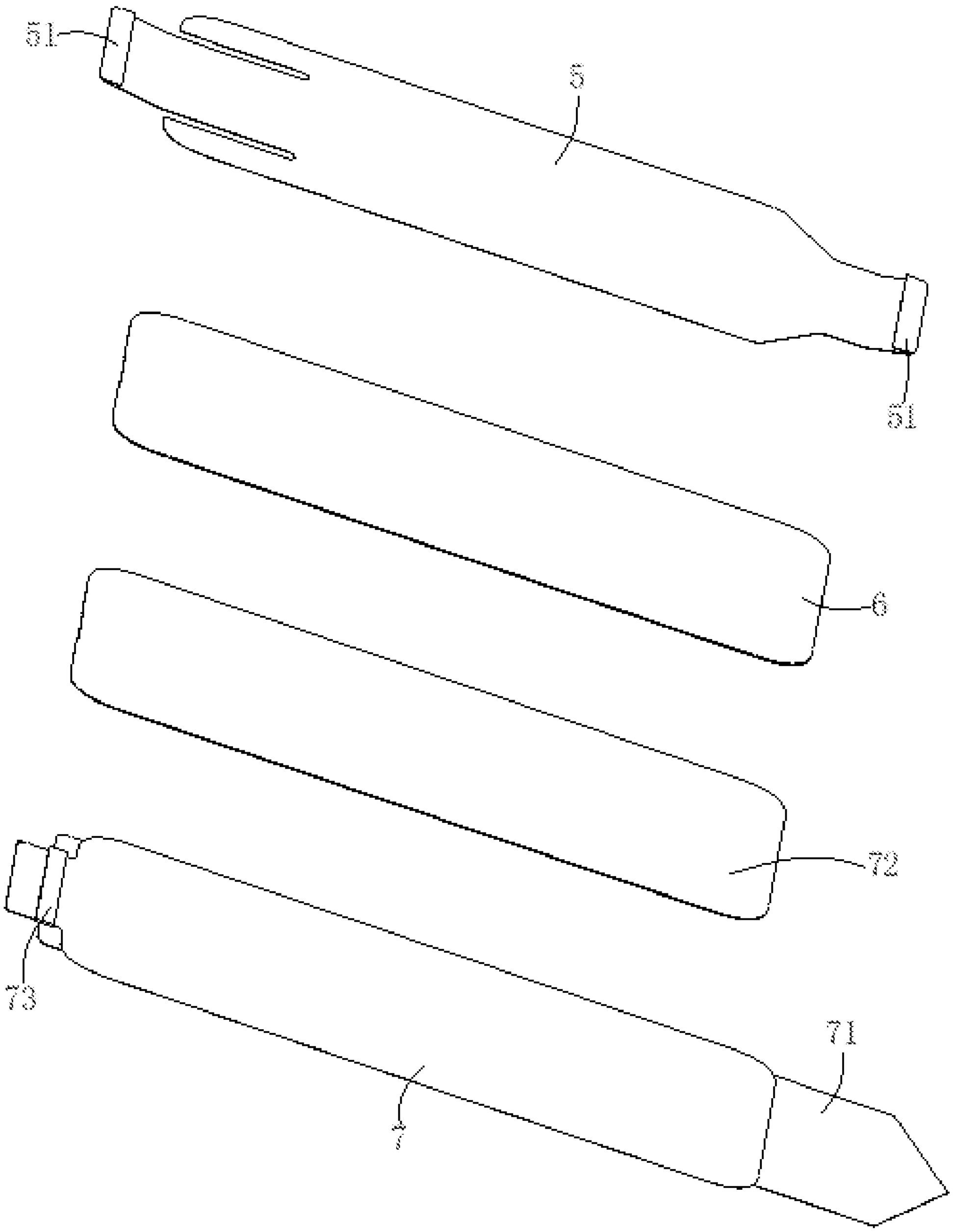
FIG. 9 is an exploded perspective view of a protective film set according to the present invention.
Figure 10:
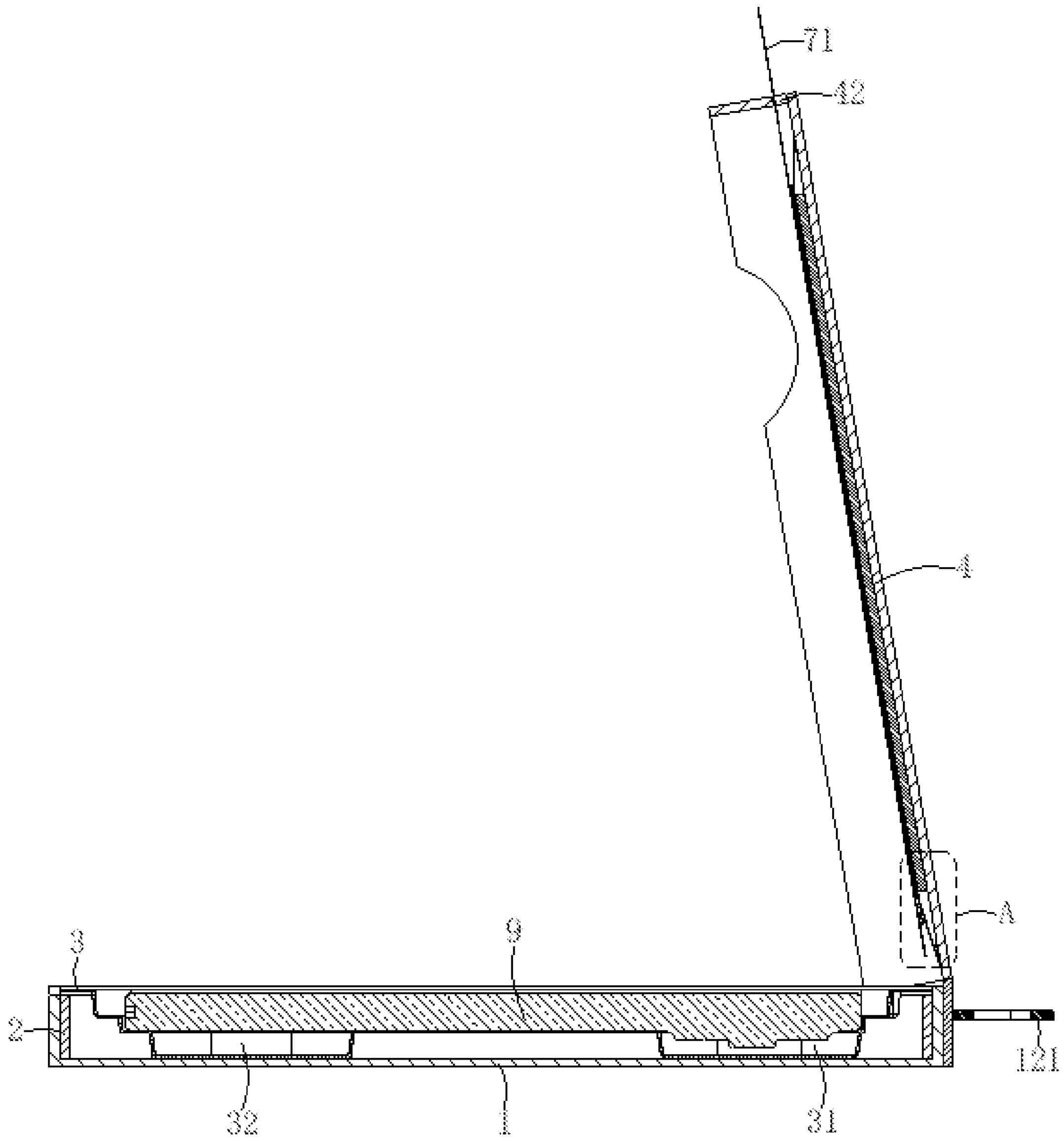
FIG. 10 is a cross-sectional view of a packaging box with a film sticking function in an open state according to the present invention.
Figure 11:
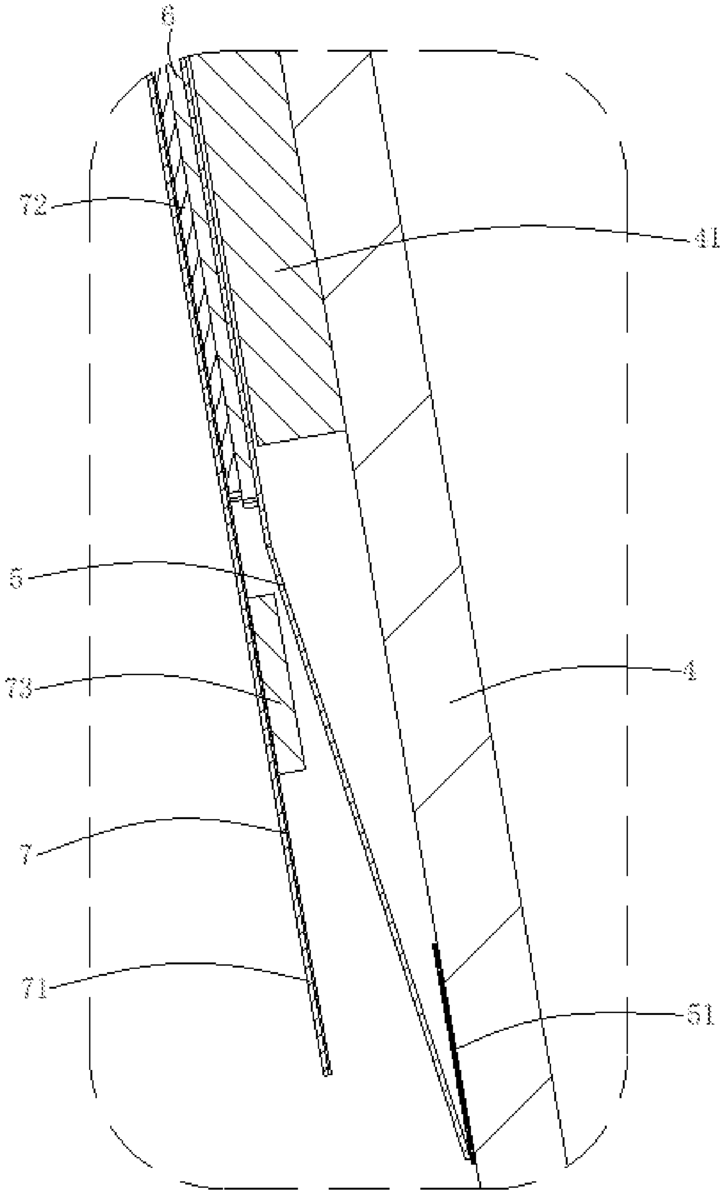
FIG. 11 is an enlarged view of A in FIG. 10.

Referring to FIG. 6 to FIG. 8, a pressure-maintaining tampon 41 is fixed to the inner wall of the upper cover 4 in a length direction thereof, the pressure-maintaining tampon 41 is sandwiched between the upper cover 4 and the protective film set 8, and the pressure-maintaining tampon 41 has certain elasticity and is strip-shaped.

Referring to FIG. 6, FIG. 7, FIG. 9, FIG. 10 and FIG. 11, the protective film set 8 includes a mask 5, a glass protective film 6 and a release film 7; the mask 5, the glass protective film 6 and the release film 7 are sequentially stacked from inside to outside and arranged on the inner wall of the upper cover 4; the pressure-maintaining tampon 41 is located between the mask 5 and the upper cover 4, and both ends of the mask 5 are separately provided with fixing adhesives 51 and adhesively connected with the inner wall of the upper cover 4 through fixing adhesive 51, respectively; the pressure-maintaining tampon 41 is located between the two fixing adhesives 51, the mask 5 covers the pressure-maintaining tampon 41, the fixing adhesive 51 can be a double-sided tape, the release film 7 is adhered to the glass protective film 6 by AB glue 72, the pull-out bar 71 is provided at the bottom of the release film 7, one end, away from the pull-out opening 42, of the release film 7 is a connecting end thereof, a certain gap is between one end, close to the pull-out opening 42, of the release film 7 and the pull-out bar 71, one end, away from the pull-out opening 42, of the pull-out bar 71 is connected to the connecting end of the release film 7, to prevent the release film 7 from falling off, an adhesive fixing bar 73 is provided at the connecting end of the release film 7, the adhesive fixing bar 73 is located between the mask 5 and the connecting end of the release film 7, so that the adhesive fixing bar 73 can stick the connecting end of the release film 7 and the mask 5 together. In the present invention, the adhesive fixing bar 73 is located outside the glass protective film 6; if the adhesiveness of the adhesive fixing bar 73 fails, the release film 7 will be separated from the mask 5, the release film 7 will shift or even open as the packaging box is transported, directly leading to poor film sticking of the glass protective film 6 (for example, bubbles and white edges on the surface of glass protective film 6), affecting the use.

Referring to FIG. 1 to FIG. 11, a film sticking method for the packaging box with a film sticking function provided by the present invention includes the following steps:

- opening an upper cover 4 in a rotary manner, taking out an alcohol pack, instructions and other accessories in a receiving slot 32, and wiping a mobile phone 9 to be stuck and a screen thereof;
- placing the mobile phone 9 with the screen facing up in a mobile phone placement slot 33, whereby a protruding camera on the back of the mobile phone 9 is located in a camera avoidance slot 31;
- covering the upper cover 4 in a rotary manner, whereby a protective film set 8 and the upper cover 4 jointly cover a box body 1 and at this time, the entire protective film set 8 is located just above the screen of the mobile phone 9, compressing the pressure-maintaining tampon 41, pulling out the pull-out bar 71 manually and vigorously, and pulling the release film 7 out of the pull-out opening 42, to take away the dust on the mobile phone screen; and
- pressing a top of the box body 1, sticking the glass protective film 6 on the screen of the mobile phone 9 through AB glue 72, opening the upper cover 4 in a rotary manner through two handle slots 43, where since the mask 5 is stuck on the upper cover 4 through fixing adhesives 51, the mask 5 will be separated from the glass protective film 6 as the upper cover 4 rotates, at this time, the glass protective film 6 is quickly stuck on the screen of the mobile phone 9 under the elastic force of the pressure-maintaining tampon 41, and the user only needs to take out the mobile phone 9 from the box body 1 to use the mobile phone 9 normally.

The packaging box with a film sticking function provided by the present invention adopts the upper cover 4, the box body 1, the bottom frame 2 and the positioning plate 3 made of an environmentally friendly paper material, to combine multiple mobile phones in one box conveniently, and only the positioning plate 3 for positioning the mobile phone needs to be replaced, which is environmentally friendly and convenient for sticking the protective film, and suitable for all people to stick films quickly, so as to solve the problem of film sticking for handicapped people. The packaging box is reusable and can achieve film sticking for multiple times by simply replacing the protective film set 8.

According to the packaging box with a film sticking function provided by the present invention, the protective film set 8 is arranged on the inner wall of the upper cover 4, the upper cover 4 and the protective film set 8 directly cover the bottom box 21 to form the positioning cavity, thereby achieving the purpose of packaging the glass protective film 6. The positioning cavity is used to place the mobile phone 9 and various accessories, and then the pull-out bar 71 is pulled out of the pull-out opening 42 to pull out the release film 7 of the protective film set 8 and take away the dust on the mobile phone 9, such that the glass protective film 6 of the protective film set 8 is accurately stuck to the screen of the mobile phone 9. Integrating the functions of mobile phone film sticking and glass protective film 6 packaging, the entire packaging box is easy to position and stick, and suitable for all people to stick films quickly.

The above disclosure is merely preferred embodiments of the present invention and cannot be used to limit the scope of protection of the present invention. Therefore, equivalent changes made in the patent scope of the present invention still fall within the scope of the present invention.

The invention claimed is:

1. A packaging box with a film sticking function, comprising:

a bottom box; and an upper cover, wherein a side wall of the upper cover is provided with a pull-out opening, an inner wall of the upper cover is connected to a protective film set, a pull-out bar of the protective film set passes through the pull-out opening and extends out of the pull-out opening, and the protective film set and the upper cover jointly cover the bottom box to form a positioning cavity;

wherein the bottom box includes a box body having a hollow covering surface, and a positioning assembly disposed in the box body, the positioning assembly including a bottom frame and a positioning plate having an edge in support connection to the box body through the bottom frame;

wherein a limiting slot is disposed on a side wall of the box body, the limiting slot is disposed in a width direction of the protective film set, and when the upper cover is covered by the bottom box, the protective film set is disposed in the limiting slot;

wherein the pull-out opening is arranged in a width direction of the upper cover, a fixing plate is secured to a side wall, away from the pull-out opening, of the bottom box, and the bottom box is in folded and rotary connection to the upper cover through the fixing plate;

wherein an outer wall of the fixing plate is vertically connected to a hanging buckle, and the two opposite side walls of the upper cover in a length direction thereof are provided with a plurality of handle slots, respectively;

wherein a pressure-maintaining tampon is secured to the inner wall of the upper cover in a length direction thereof, and the pressure-maintaining tampon is disposed between the upper cover and the protective film set;

wherein the protective film set includes a mask, a glass protective film, and a release film;

wherein the mask, the glass protective film, and the release film are sequentially stacked from inside to outside and arranged on the inner wall of the upper cover;

wherein the pull-out bar is arranged at a bottom of the release film and connected to a connecting end of the release film;

wherein both ends of the mask are adhesively connected to the upper cover through two adhesives, respectively;

wherein the pressure-maintaining tampon is disposed between the two adhesives, and the release film is adhered to the glass protective film; and wherein the connecting end of the release film is adhered to the mask through a fixing bar disposed externally of the glass protective film.

* * * * *